RETRIEVABLE WELL PACKER AND ANCHOR

Original Filed July 25, 1958 4 Sheets-Sheet 1

INVENTORS.
EARNEST H. CLARK, JR.
JULIAN D. KEITHAHN

ATTORNEYS.

RETRIEVABLE WELL PACKER AND ANCHOR

Original Filed July 25, 1958 4 Sheets-Sheet 2

INVENTORS.
EARNEST H. CLARK, JR.
JULIAN D. KEITHAHN

ATTORNEYS.

RETRIEVABLE WELL PACKER AND ANCHOR

Original Filed July 25, 1958 4 Sheets-Sheet 3

INVENTORS.
EARNEST H. CLARK, JR.
JULIAN D. KEITHAHN

ATTORNEYS.

RETRIEVABLE WELL PACKER AND ANCHOR

Original Filed July 25, 1958 4 Sheets-Sheet 4

INVENTORS.
EARNEST H. CLARK, JR.
JULIAN D. KEITHAHN

ATTORNEYS.

United States Patent Office

Re. 25,639
Reissued Sept. 8, 1964

25,639

RETRIEVABLE WELL PACKER AND ANCHOR

Earnest H. Clark, Jr., Downey, Calif., and Julian D. Keithahn, Houston, Tex., assignors to Baker Oil Tools, Inc., Los Angeles, Calif., a corporation of California Original No. 3,008,523, dated Nov. 14, 1961, Ser. No. 750,951, July 25, 1958. Application for reissue Sept. 9, 1963, Ser. No. 307,758
25 Claims. (Cl. 166—129)

Matter enclosed in heavy brackets [ ] appears in the original patent but forms no part of this reissue specification; matter printed in italics indicates the additions made by reissue.

The present invention relates to subsurface well bore equipment, and more particularly to packers and anchors adapted to be run and set in well casing and similar conduit strings disposed in well bores.

Certain types of well packers or anchors are set hydraulically in casing disposed in a well bore, fluid pressure in a tubular running-in string to which the particular tool is attached forcing its gripping elements into anchoring engagement with the wall of the well casing. Lowering of the tool on the tubular string through the fluid in the well casing oftentimes creates substantial pressure differentials in the well tool, resulting in undesired hydraulic expansion of the gripping elements and dulling of their wickers or teeth, which slide along the casing walls during downward movement of the tool. Consequently, the gripping elements cannot subsequently anchor the tool in the well casing, particularly when the tool is subjected to comparatively high pressures.

Accordingly, it is an object of the present invention to provide a hydraulically set subsurface well tool in which the gripping elements do not become dulled during lowering of the tool in the well bore.

Another object of the invention is to equalize the fluid pressure on the gripping elements while the tool is being run in the well bore to prevent their outward expansion hydraulically.

A further object of the invention is to provide a well packer or anchor having gripping elements hydraulically shiftable to casing anchoring position, in which the pressure on the elements can be equalized while running the tool in the casing by holding a control valve open, the valve being closed when the gripping elements are to be expanded hydraulically against the casing, the hydraulic pressure developed in or externally of the tool being incapable of shifting the valve to open position.

Yet another object of the invention is to provide a well packer or anchor embodying an equalizing or by-pass valve for equalizing the pressure on the gripping elements of the packer or anchor, the valve being readily shiftable from closed to open position despite the presence of relatively high pressures in or externally of the tool.

An additional object of the invention is to provide a well packer embodying a rubber or rubber-like packing structure, the tool having a relatively large diameter passage therethrough and a by-pass around the packing structure, the packing structure being comparatively thick to insure the presence of a large volume of packing material for effecting a seal against a companion casing wall.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1 and 1a together constitute a longitudinal section and side elevational view through a well packer of the retrievable type with its parts in retracted position for lowering the tool in a well casing, FIG. 1a constituting a lower continuation of FIG. 1;

FIGS. 2 and 2a together constitute a longitudinal section through the well tool illustrated in FIGS. 1 and 1a with the well tool anchored in packed-off condition against the well casing, FIG. 2a being a lower continuation of FIG. 2;

FIG. 3 is an enlarged fragmentary longitudinal section through the lower portion of the tool disclosed in FIG. 1a;

Figure 1:
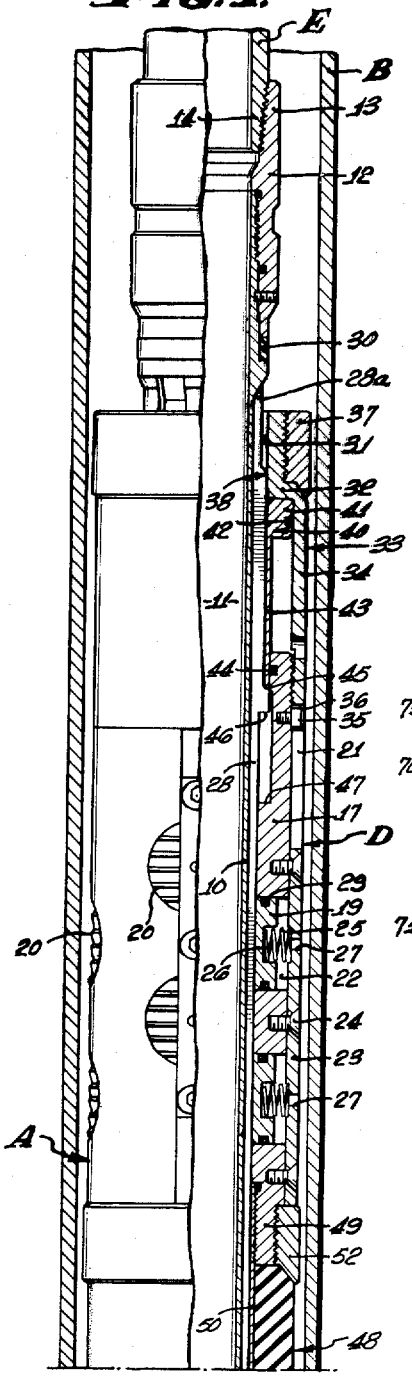

The specific well tool shown in the drawings is a retrievable well packer A adapted to be anchored to a well casing B against movement in both an upward and a downward direction, and to be packed-off thereagainst to prevent leakage of fluid thereby. The lower portion C of the tool is a set down type of well packer, whereas the upper portion D of the tool is an anchor to prevent upper movement of the apparatus in the well casing. The apparatus A is lowered in the well casing on a tubular string E, such as tubing or drill pipe extending to the top of the well bore, and through which fluent substances under pressure, such as cement slurry, acid, and the like, can be pumped through a passage of the tool and discharged from its lower portion.

The well packer A includes a central main body or mandrel 10 having a passage 11 therethrough that may be of relatively large diameter and no smaller than the diameter through the tubular string E thereabove. The upper portion of this body is threadedly secured to a body sub 12 having a threaded box 13 for screwing the sub to the lower pin end 14 of the tubular string. The mandrel extends downwardly throughout the entire length of the tool and has a lower threaded pin 15 for threadedly attaching the tool to a lower section of tubing 16 or a lower tool.

The upper portion D of the tool includes an anchor body 17 surrounding the mandrel 10 and relatively slidable with respect thereto. This anchor body has a plurality of circumferentially spaced cylindrical bores 18 therethrough, each of which contains a piston gripping element 19 slidably radially therein. The cylindrical bores open to the interior of the anchor body 17 and also to the exterior thereof. The piston gripping elements 19 have external wickers or teeth 20 that may face in an upward direction, so as to be capable of anchoring the apparatus to the well casing B against upward movement therewithin. As disclosed, a plurality of cylinders 18 and gripping elements 19 are provided in longitudinal alignment with one another, there being sets of such longitudinally aligned gripping elements staggered relative to one another around the circumference of the anchor body 17.

The anchor body has an external groove 21 extending across each set of aligned cylinders which merge into companion grooves 22 formed in the outer portions of the longitudinally aligned gripping elements 19. Disposed in the body and gripping element grooves 21, 22 is a retainer member and spring seat in the form of a bar 23 which is suitably secured to the anchor body, as by means of the screws 24. Each bar will retain the piston gripping elements 19 properly oriented with their wickers or teeth 20 facing in an upward direction. It also serves as the outer spring seat for a helical compression spring 25 disposed in and bearing against the socket portion 26 of each piston gripping element, tending to urge the piston gripping element inwardly to its fullest extent to facilitate inward and outward radial movement of each gripping member 19. The bar may be provided with bleeder holes 27 therethrough opening into the pistons 19.

The piston gripping elements 19 are expanded outwardly whenever fluid pressure differential sufficient to overcome the compressive force of the springs 25 is present interiorly of the anchor body 17. In the present case, such fluid pressure is derived from the exterior of the tool below the anchor portion D of the apparatus, which pressure can pass through longitudinally extending external grooves 28 in the mandrel or body of the tool to the interior of the anchor body 17. These grooves 28 extend from a location adjacent the upper end of the mandrel 10 to a location near its lower portion. Actually, the grooves 28, when their upper ends 28a are open, serve as a by-pass through *the body structure 10, 17 of* the tool as described hereinbelow. However, when by-passing of fluid is prevented, pressure differential of the fluid within the grooves 28 can pass to the interior of the cylinders 18, acting upon the pistons 19 to urge them outwardly and bring their teeth 20 into anchoring engagement with the wall of the well casing B. Leakage of fluid along each piston 19 is prevented by providing a suitable piston ring or side seal ring 29 in the piston for slidable sealing against the wall of each cylinder 18.

The inner mandrel 10 is shiftable longitudinally with respect to the anchor body 17 to open and close the by-pass grooves 28. The mandrel carries a suitable seal ring 30, which is held between the body sub 12 and the main portion of the body, this seal ring being adapted to move downwardly within a cylindrical seat 31 formed in a cylinder head portion 32 of a cylinder 33. A cylinder skirt 34 depends from the head 32 and is threadedly secured to the upper end of the anchor body 17. Inadvertent threaded detachment between these parts is prevented by a cap screw 35 threaded in the anchor body with its head disposed in a recess 36 in the lower end of the skirt. A gauge ring 37 may be threaded on the cylinder head 32 to provide the desired clearance with the adjacent wall of the well casing B.

When the mandrel 10 is shifted downwardly relative to the anchor body 17 and cylinder 33, its valve head 38 and seal ring 30 therein are moved within the cylinder seat 31, closing the upper portion 28a of the by-pass grooves 28 extending along the exterior of the body 10. To enable the pressure below the tool, and tending to elevate the mandrel 10, to be counterbalanced, an annular balancing piston 40 is disposed in the annular cylinder 33. Thus, the annular piston includes a head 41 that may initially occupy an upper position adjacent the cylinder head 32, this piston head being slidable along the wall of the cylinder skirt 34, leakage of fluid between the piston and cylinder skirt being prevented by a suitable piston ring 42 carried by the piston and slidably sealing against the wall of the skirt. The piston has a skirt 43 depending from its head 41, which is slidable along and within the upper portion of the anchor body 117, leakage of fluid therebetween being prevented by a suitable side seal 44 mounted in the upper portion of the anchor body and slidably sealing against the periphery of the skirt. The piston skirt 43 terminates above an upwardly facing thrust shoulder 45 on the mandrel, the mandrel having a downwardly facing shoulder 46 which is spaced initially above a companion shoulder 47 on the anchor body 17. Downward force between the mandrel 10 and anchor body 17 can be transmitted from the mandrel shoulder 46 to the anchor body shoulder 47, as described hereinbelow.

The upwardly anchoring portion D of the apparatus is secured to the downwardly anchoring portion C of the apparatus, which also includes a packing structure 48 for effecting a seal against the wall of the well casing B. The lower portion 49 of the anchor body 17 constitutes an upper abutment for the packing structure 48. This packing structure may include a back-up or connector sleeve 50, the upper end of which is threadedly attached to the lower portion 49 of the anchor body, the sleeve being slidable relative to the mandrel 10, and extending through the packing elements 51 of the structure, which may be of any suitable type. As shown, the packing structure includes an upper rubber or rubber-like packing element 51 engaging the lower end 49 of the anchor body 17 and a gauge ring 52 threadedly secured thereto to provide the proper clearance with the adjacent wall of the well casing. This upper packing element engages a metallic spacing ring 53 which, in turn, contacts an intermediate rubber-like packing element 51, the lower end of which engages a metallic spacing ring 53 which contacts the upper end of a lower rubber or rubber-like packing element 51 that engages a lower abutment 54 threadedly attached to a lower expander 55. This lower abutment has an inwardly directed flange 56 adapted to contact an outwardly extending flange 57 at the lower end of the back-up sleeve 50. When the upper abutment 49 is moved toward the lower abutment 54, the packing members 51 are foreshortened and expanded outwardly into sealing engagement with the wall of the well casing B, as well as against the back-up sleeve 50, which is disposed around all of the longitudinal grooves 28 in the inner mandrel or body 10. When the upper abutment 49 moves toward the lower abutment 54, the lower end of the back-up or connector sleeve 50 can shift downwardly in an annular space 58 between the lower expander 55 and the periphery of the mandrel 10.

The lower portion of the expander has an external conical or expander surface 59 tapering in a downward and inward direction, which is adapted to coact with companion inner tapered surfaces 60 on the anchor portions 61 of rocking types of slips 62 disposed in a longitudinal grooves 63 in a slip ring 64 slidable relative to the body 10. Each slip has a lower drag portion 65 which is urged outwardly into frictional engagement with the wall of the well casing B by one or a plurality of helical compression springs 66 mounted in each groove 63 and bearing against the base of the latter and against the drag portions 65 of the slips. The slips 62 are so designed that the springs 66 force the drag portions 65 into full frictional engagement with the wall of the well casing B, rocking the anchor portions 61 inwardly away from the wall of the well casing, the downwardly facing wickers or teeth 67 on the anchor portions being prevented from contacting the adjacent casing wall. However, when the expander 55 moves downwardly relative to the slips 62, its surface 59 will engage the anchor portions 61 and rock them outwardly into engagement with the casing wall, the rocking action at first occurring about the upper part of the drag portion 65 of each slip.

The slips 62 are movable jointly downwardly in the casing by a retainer ring 68 mounted in external grooves 69 provided in the slips between their drag and anchor portions 65, 61, the upper end of this retainer ring being engaged by an outwardly directed flange 70 at the upper end of the slip ring 64. Thus, downward movement of the slip ring 64 will cause its flange 70 to engage the ring 68, the latter engaging the lower sides of the slip grooves 69 to pull all of the slips 62 downwardly in the well casing. Joint upward movement of the slips 62 is provided by a stop ring 71 engaging their lower ends, this stop ring being suitably secured to the slip ring 64 by longitudinally extending screws 72. When the apparatus is out of the well casing, outward movement of the slips 62 is prevented by the retainer ring 68 and also by the lower terminals 73 of the slips engaging a stop rim 74 projecting upwardly from the stop ring 71.

Separating movement between the expander 55 and slips 62 is limited by the longitudinal limit pins or screws 75 threaded in the lower expander 55 and received within bores 76 in the slip ring, the heads 77 of the screws engage the upper ends of the bores or sockets 76, causing the lower expander 55 to pull upon the slip ring 64 and the slips 62 by virtue of the engagement of the screw heads 77 with the slip ring 64, while permitting the lower expander 55 to shift downwardly relative to the slips 62, since the screws 75 merely slide within the longitudinal bores 76 in the slip ring 64.

The lower expander 55 is shiftable downwardly relative to the lower slips 62 to anchor them against the well casing B, and the upper abutment 49 is movable toward the lower abutment 54 to expand the packing structure 48 against the well casing, in response to downward movement of the mandrel 10 relative to the parts that surround it. Such relative downward movement will also close the by-pass passages 28 of the apparatus, which, as shown in the drawings, may extend from a location below the expander 55 to the upper portion of the mandrel 10. The ability of the body or mandrel 10 to move downwardly to effect setting of the apparatus is governed by a control unit or clutch mechanism 80 at the lower part of the apparatus. As shown, such control unit includes an outer clutch housing 81 threadedly secured to the stop ring 71 and terminating in an inwardly directed flange 82. Contained within the housing 81 is a control sleeve 83, the upper end of which is threadedly attached to the stop ring 71 and the lower end of which is attached, as by pins 84, to a clutch sleeve or ring 85 having a recess 86 therein in which a dog or clutch element 87 is located. This clutch element is urged inwardly by a compression spring 88, to place its upwardly facing wickers or teeth 89 in clutching engagement with downwardly facing external wickers or teeth 90 formed on the exterior of the mandrel 10 along a substantial longitudinal length thereof and extending circumferentially therearound. When the clutch element 87 is engaged with the ratchet teeth 90 on the mandrel, relative downward movement between the mandrel 10 and the clutch 80 surrounding it cannot occur. Since the clutch housing 81 is secured to the slip structure, the latter will move downwardly with the mandrel, relative downward movement of the mandrel 10 with respect to the expander 55 and packing structure 48 also being prevented, in view of the fact that the slip sleeve 64 exerts a downward pull on the lower expander 55 through the longitudinal screws 75, and the fact that the lower abutment 54 engages the flange 57 of the back-up sleeve 50 to pull such sleeve downwardly, which also pulls the anchor portion D of the apparatus downwardly with it, since the sleeve 50 is threadedly secured to the anchor body 17.

When the clutch dog or element 87 is released from the ratchet teeth 90 on the mandrel, the latter can shift downwardly relative to the parts surrounding it, since downward movement of such latter parts is resisted by frictional engagement of the drag portions 65 of the slips 62 against the wall of the well casing. Release of the clutch element 87 is determined by a cam or key 92 having an upper head portion 93, which has a segment of a thread formed thereon threadedly meshing with internal threads 94 formed on the interior of the control sleeve 83. The key 92 is slidable relatively within a keyway 95 formed in the exterior of the mandrel 10, and which may actually constitute a continuation of one of the by-pass grooves 28 in the mandrel. The lower portion 96 of the key is a cam portion that extends outwardly beyond the ratchet teeth 90 on the body, and which is adapted to engage the clutch dog 87 to cam it laterally outward from engagement with the body teeth 90. The lower end 97 of the cam 96 is tapered in a downward and inward direction so that it can engage the dog 87 and shift it outwardly as a result of its downward movement along the control sleeve 83 and dog. The ends 98 of the dog are tapered or beveled to enable the cam portion 96 to engage the dog 87 rotationally and also effect its disengagement from the body ratchet teeth 90 against the force of its return spring 88.

Initially, the key or cam element 92 is disposed in an upper position with respect to the control sleeve 83, its threaded head engaging a stop 99 at the upper end of the control sleeve which limits the extent of upward movement of the key relative to the control sleeve. The threaded interconnection between the key head 93 and the control sleeve 83 is a right hand one, such that right hand rotation of the mandrel 10 and key 92 will effect a downward feeding of the key along the control sleeve 83 to bring the cam portion 96 of the key downwardly to a position in which it can turn across the inner face of the clutch element 87 and cam it out of engagement with the ratchet teeth 90 on the mandrel. The extent of downward movement of the key is limited by engagement of its head 93 with a rotational stop element 100 extending across the lower end of the control sleeve thread 94. When the threaded head 93 of the key engages such stop element 100, the cam 96 is disposed fully across the clutch or dog element 87 to hold it disengaged from the teeth 90 on the mandrel, thereby allowing the mandrel 10 to move downwardly within the clutch housing 81.

Figure 5:
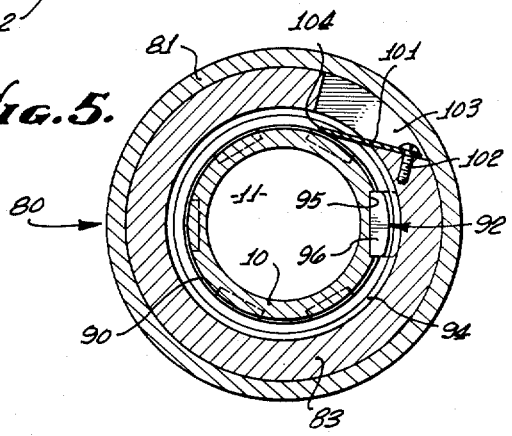
FIG. 5 is a cross-section taken along the line 5—5 on FIG. 3.
Figure 6:
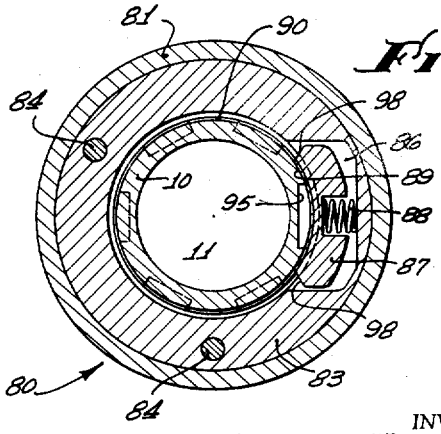
FIG. 6 is a cross-section taken along the line 6—6 on FIG. 3.

Rotation of the mandrel 10 and key 92 in the opposite direction, or to the left, is limited after the key has been threaded downwardly, to insure its disposition out of engagement with the clutch dog 87 to permit the ratchet teeth 89 on the latter to coengage with the ratchet teeth 90 on the mandrel. This latter stop is in the form of a one-way acting element, such as a leaf spring 101 suitably secured to the control sleeve 83, as by means of a screw 102, the leaf spring being disposed in a sleeve opening 103 and extending inwardly of the threaded portion 94 of the sleeve. It will be noted (FIG. 5) that the leaf spring 101 extends at an agle inwardly of the control sleeve 83 so that the key head 93 will engage the inner surface of the leaf spring, when rotated in a right hand direction, and deflect the leaf spring outwardly, the head moving thereby and continuing its downward threading along the control sleeve 83 until the head 93 of the key engages the rotational stop 100 at the lower end of the control sleeve 83. However, once the head 93 has moved past the leaf spring 101, reverse rotation, or rotation to the left, of the key will cause it to engage the end 104 of the leaf spring, which will then prevent any further rotary movement of the mandrel to the left relative to the control sleeve 83 and the clutch dog 87 carried within the clutch housing. Thus, the one-way leaf spring 101 will permit downward feeding of the key 92 along the control sleeve 83 to its dog camming position, but will prevent upward threading therealong beyond the end 104 of the leaf spring 101, at which point the cam portion 96 is out of engagement with the clutch element 87. However, it can be turned in the right hand direction back into engagement with the clutch element 87 to cam and hold such element out of engagement with the mandrel teeth 90.

Figure 1A:
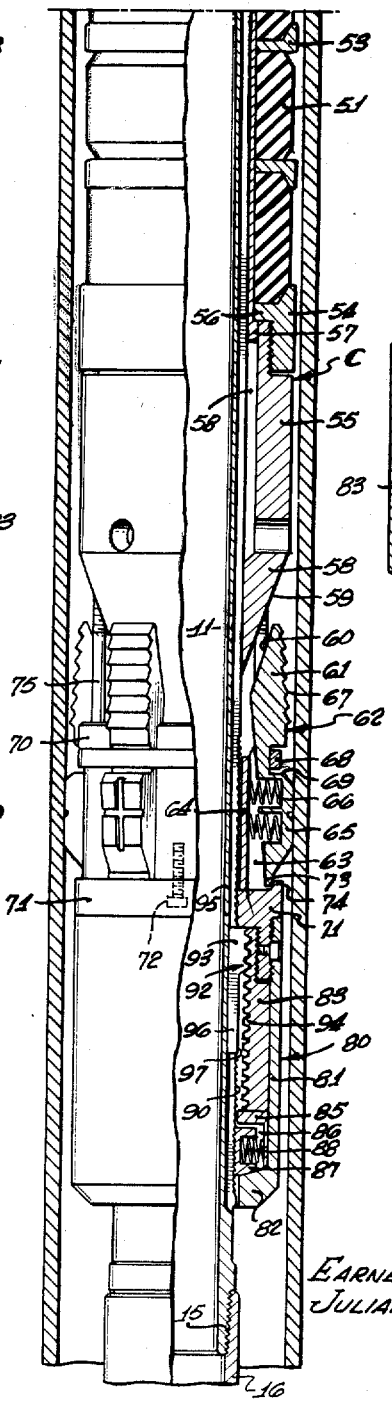
Figure 11:
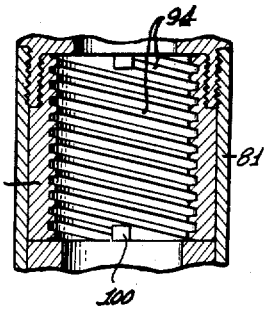
FIG. 11 is a longitudinal section through the control sleeve and clutch housing portion of the apparatus.
Figure 2:
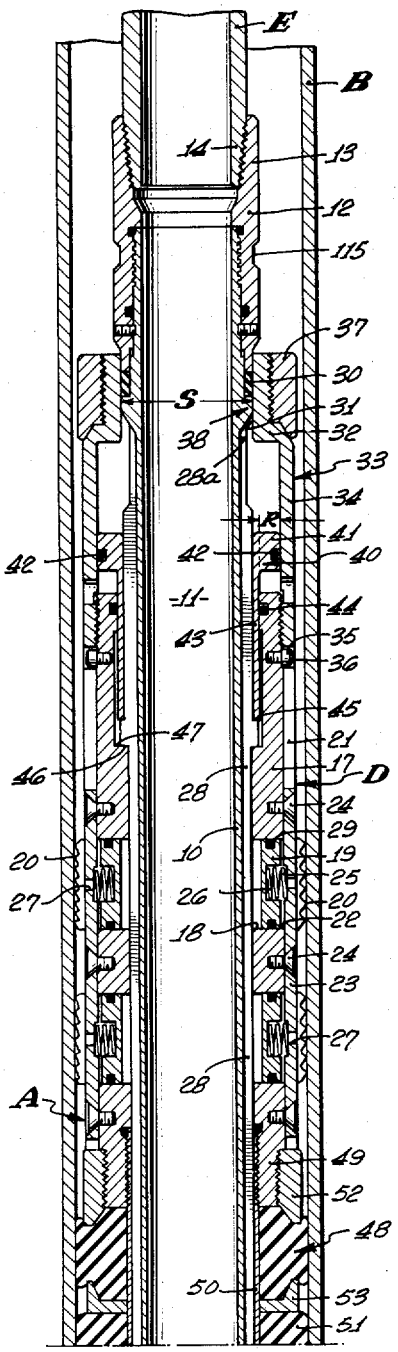
Figure 2A:
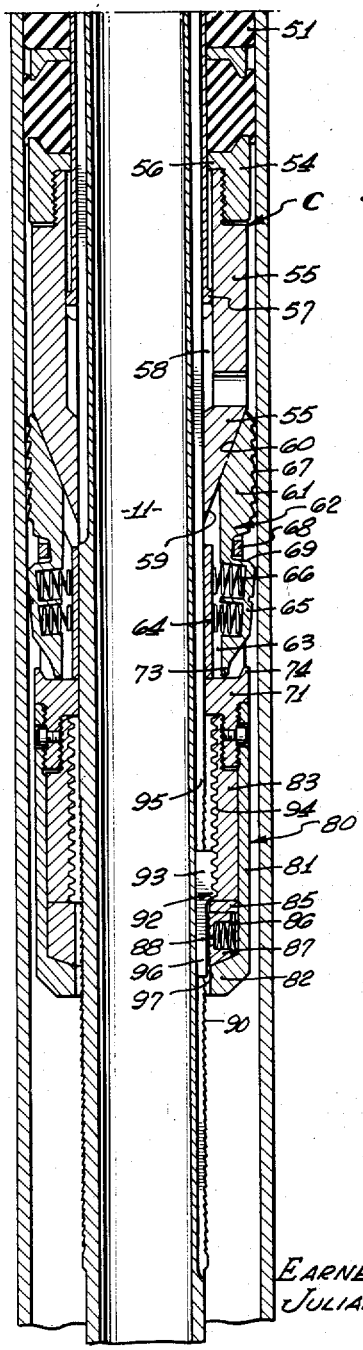

In the use of the apparatus within the well casing, its parts initially occupy the retracted positions disclosed in FIGS. 1 and 1a. The key 92 is preferably in its upper position along the control sleeve 83, the mandrel 10 being in its uppermost position as determined by engagement of the thrust shoulder 45 with the piston skirt 43, the piston 40 engaging the cylinder head 32, and the valve head 38 on the mandrel being disposed above its companion seat 31, such that the by-pass passages 28 through the apparatus are fully opened, such by-pass passages communicating with the interior of all of the cylinders 18 containing the piston gripping elements 19. Since the key 92 is in its uppermost position, it is substantially removed from the clutch dog 87 and cannot inadvertently release such clutch dog from clutching engagement with the mandrel 10. The spring 88 retains the clutch dog 87 in engagement with the mandrel 10, such that downward movement of the mandrel as a result of moving the tubular string E downwardly will cause the clutch mechanism 80 to move downwardly with the mandrel, pulling the slips 62 downwardly with it. Such downward movement of the slips will result in a downward pulling, through the screws 75, of the lower expander 55, which will exert a pull on the backing sleeve 50 in a downward direction, which is attached to the anchor body 17, which will, in turn, also move downwardly with the mandrel 10, as well as all of the parts secured thereto. During such downward movement through the fluid in the well casing B, a pressure differential cannot be built up behind the piston gripping elements 19 and urge them outwardly into engagement with the wall of the well casing, since the pressure externally of the gripping elements and the pressure internally thereof is the same, in view of the fact that the by-pass passages 28 are wide open. Accordingly, downward movement of the apparatus through the liquid in the well casing cannot develop any pressure differentials within the cylinders 18 of the anchor portion D of the apparatus and tend to urge the gripping elements 19 outwardly, which would cause the wickers 20 to engage the wall of the casing and slide therealong, resulting in their dulling.

Figure 7:
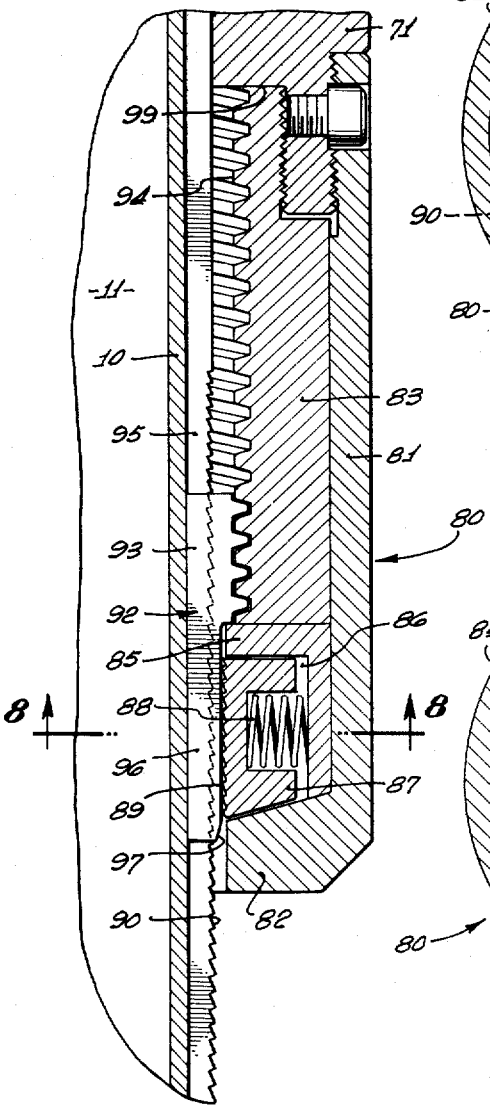
FIG. 7 is an enlarged fragmentary section through the clutch or control unit portion of the apparatus.
Figure 9:
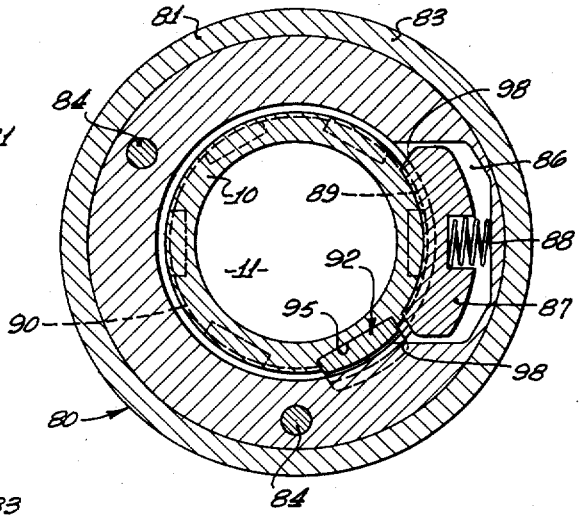
FIG. 9 is a view similar to FIG. 8, showing the clutch in engaged position.
Figure 8:
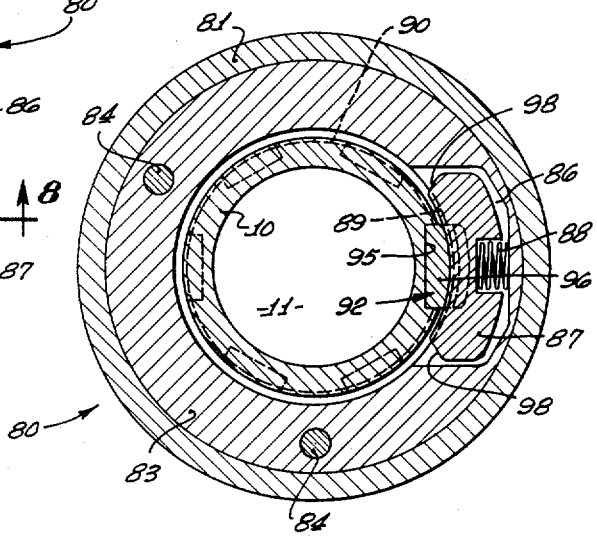
FIG. 8 is a cross-section taken along the line 8—8 on FIG. 7, with the clutch disengaged.

When the location in the well casing is reached at which the tool A is to be anchored in packed-off condition against movement in both longitudinal directions, the tubular string E and the mandrel 10 connected thereto are rotated to the right, the drag portions 65 of the slips preventing rotation of the apparatus surrounding the mandrel, including the control sleeve 83. As a result, the key 92 is rotated by the mandrel relative to the control sleeve 83, which will cause the key to feed downwardly of the control sleeve and along the keyway 95 in the mandrel. The interconnecting threads between the key 92 and control sleeve 83 may have a multiple pitch, such as a double pitch, so that only several revolutions are necessary to feed the key downwardly to the position in which it will move past the spring stop element 101 and fully into engagement with the lower rotational stop 100 on the control sleeve 83, at which time the cam portion 96 of the key will have cammed the dog 87 outwardly and will be disposed fully across from the dog, as shown in FIGS. 7 and 8. The outer clutch portions are thereby disconnected from the mandrel 10, which will allow the mandrel to move downwardly relative to the parts surrounding it. Downward movement of the latter parts is prevented by the frictional engagement of the drag portions 65 of the slips 62 against the wall of the well casing B. Such downward movement will first result in the valve head 38 moving downwardly within its companion seat 31, closing all of the by-pass passage grooves 28 in the mandrel and moving the mandrel shoulder 46 against the shoulder 47 on the anchor body 17. When such engagement occurs, further downward movement of the mandrel will shift the anchor body 17 downwardly with it, which will exert a downward force through the packing structure 48 on the lower expander 55, this lower expander then shifting downwardly relative to the slips 62, which are still prevented from moving downwardly by virtue of the frictional engagement of the slip drag portions 65 against the wall of the well casing. The expander will move behind the anchor portions 61 of the slips to rock them outwardly into anchoring engagement with the wall of the well casing about the upper ends of the drag portions 65, until the wickers 67 of the slips are embedded in the wall of the well casing.

Downward movement of the lower expander 55 cannot occur to any further extent. Accordingly, continued downward moveemnt of the tubular string E and the mandrel 10 will shift the anchor body 17 and its upper abutment 49 downwardly toward the lower abutment 54 secured to the expander, foreshortening the packing structure and expanding it outwardly into firm sealing engagement with the wall of the well casing, as well as into firm sealing engagement with the periphery of the back-up sleeve 50. The well tool A has now been anchored in packed-off condition in the well casing against downward movement therewithin.

The necessary operations can now be performed in the well casing. Fluid under pressure is pumped down through the tubular string E, passing downwardly through the passage 11 in the mandrel and out through the tool 16 therebelow. Such pressure will be exerted on the fluid surrounding the tool and below the packing structure 48, passing upwardly through the by-pass passages 28, the upper ends 28a of which are now closed, and into the cylinders 18, forcing the piston gripping elements 19 outwardly and into anchoring engagement with the wall of the well casing B, the pressure behind such gripping elements maintaining them anchored against the wall of the well casing. Any pressure below the apparatus A tending to force it up the casing B is prevented from doing so by the anchoring engagement of the wickers 20 of the gripping elements in the wall of the well casing. The upward fluid pressure is prevented from by-passing the apparatus by virtue of the packing structure 48 being sealed against the wall of the well casing B and the back-up sleeve 50.

The rubber or rubber-like packing elements 51 can be made with a relatively small inside diameter, thereby increasing their thickness when in retracted position without increasing their outside diameter, since the back-up sleeve 50 can be made comparatively thin. The thin back-up sleeve capable of withstanding high pressures is more than adequate, since it is bearing inwardly against the periphery of the mandrel 10, the back-up sleeve only being called upon to bridge the relatively narrow space of each longitudinally extending by-pass groove 28 formed in the exterior of the mandrel. By virtue of this arrangement, a greater volume of rubber material for the same outside diameter can be provided to insure an effective seal against the wall of the well casing, while a by-pass 28 is still present around the packing structure 48 when the by-pass is needed.

Upon subjecting the apparatus to pressure, such pressure ordinarily tends to shift the mandrel 10 upwardly, which would shift its by-pass valve 38 to an open condition. The tendency of the hydraulic pressure to act on the cross-sectional area of the mandrel 10 and shift it upwardly is counter-balanced by the piston structure. It will be noted that whatever pressure is acting upwardly over the cross-sectional area of the mandrel 10 is also acting through the grooves 28 on the upper end of the piston 40, urging the piston in a downward direction. Since this piston engages the mandrel shoulder 45, the hydraulic force being exerted downwardly thereon is also being exerted in a downward direction on the mandrel 10. If the pressure effective area R of the piston, which extends from the periphery of its piston skirt 43 to the inner wall of the cylinder skirt 34, is made equal to the cross-sectional area S of the mandrel, the same force from below the tool tending to move it upwardly is also acting in a downward direction on the piston 40, tending to shift the latter and the mandrel 10 downwardly, so that there is no tendency for pressure to shift the mandrel in any direction.

In view of the fact that the proper proportioning of the areas R and S can be provided to prevent any pressure from tending to shift the mandrel 10 upwardly to an open position, which would result in the release of the anchoring portion D of the apparatus from the well casing, such balancing of areas enables the mandrel to be shifted upwardly mechanically as a result of taking an upward pull on the tubular string E, whenever the by-pass passages 28 are to be opened. Despite the fact that the pressure differential below the tool might be relatively high, the mandrel 10 is easily shifted to a position which will allow the pressure internally and externally of the apparatus, as well as above and below the well packer, to equalize, enabling the apparatus to be released from the well casing. The mandrel 10 is movable upwardly regardless of whether or not the clutch element 87 is engaging the mandrel teeth 90, since the direction which the coengaging ratchet teeth 89, 90 face permits the mandrel 10 to ratchet freely upwardly through the clutch element. As a result of such upward movement, the valve 38 is not only shifted to an open position to equalize the pressure internally and externally of the apparatus, as well as above and below the apparatus, but the pressure differential in the cylinder 18 is relieved, allowing the springs 25 to retract the gripping elements 19 from the well casing.

The mandrel 10 is moved upwardly to cause its shoulder 45 to move the piston 40 upwardly, until the piston engages the cylinder head 32, whereupon the cylinder 33 and the anchor body 17 are moved upwardly to shift the upper abutment 49 away from the lower abutment 54, permitting the packing structure 48 to retract. The upward motion is transferred through the back-up or connector sleeve 50 and the flange 57 of the latter to the lower abutment 54 and the lower expander 55, pulling the latter upwardly relative to the slips 62, since upward movement of the latter is resisted by the frictional engagement of the drag portions 65 against the well casing. The upward movement of the expander will allow the springs 66 to rock the drag portions 65 of the slips back into full surface engagement with the wall of the well casing, and their anchor portions 61 out of engagement with the well casing. Upward movement of the lower expander 55 is transferred through the pulling screws or limit pins 75 to the slip structure and the surrounding clutch mechanism 80, all of the parts then moving upwardly as a unit, with the drag portions 65 of the slips sliding frictionally along the wall of the well casing. The apparatus can be elevated in the well casing and removed completely therefrom.

At any time after the apparatus has been released from the well casing it can be re-set merely by turning the mandrel 10 to the right, to cause the cam 96 to again disengage the dog 87 from the ratchet teeth 90. If the apparatus is to be moved to a lower position in the well casing B, then the tubing string E and mandrel 10 are turned to the left sufficiently to insure that the key 92 engages the end 104 of the spring or one-way stop member 101, which will insure that the dog is free to engage the mandrel, permitting the entire mechanism to be moved as a unit downwardly in the well casing.

Figure 10:
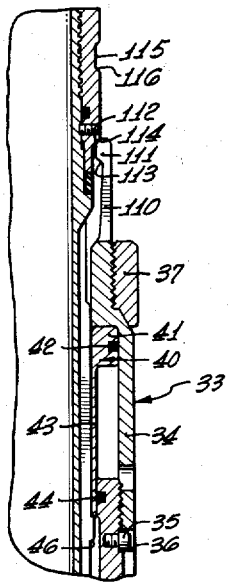
FIG. 10 is a fragmentary longitudinal segment through a modified portion of the apparatus.
Figure 3:
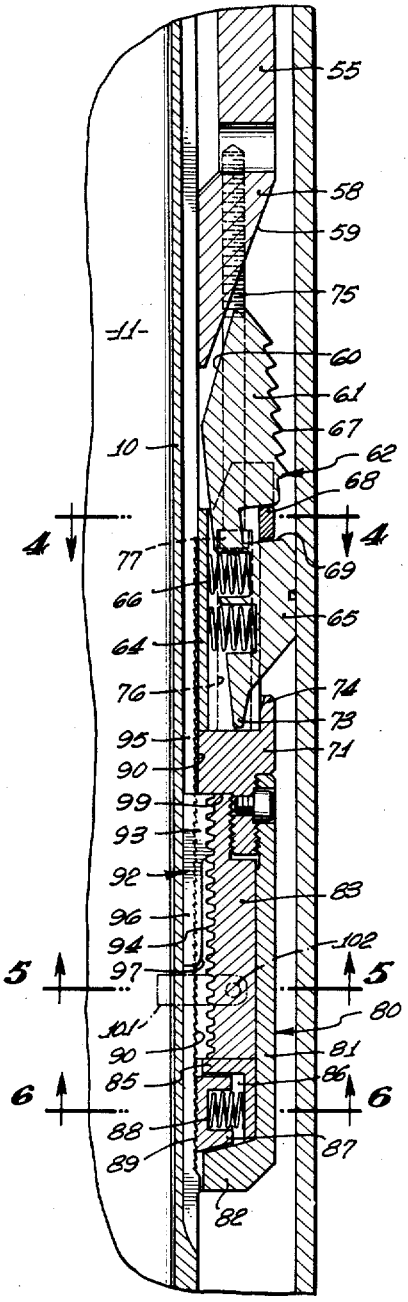
Figure 4:
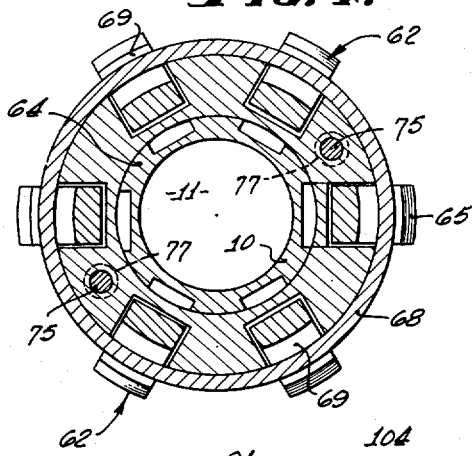
FIG. 4 is a cross-section taken along the line 4—4 on FIG. 3.

The mandrel 10 may be releasably held in an elevated position, in which the by-pass 28 is open, as shown in FIG. 10, or in a by-pass closing position. Circumferentially spaced latch arms 110 may be formed integrally with the cylinder head 32, extending thereabove. These latch arms terminate in heads 111 having upper and lower tapered or cam surfaces 112, 113. The upper cam surface 112 is adapted to engage a companion cam surface 114 on the body sub 12 tapering in a downward and inward direction, to resist downward movement of the mandrel 10 relative to the cylinder 33 (as in FIG. 10), thereby holding the by-pass valve in its open position. However, when sufficient downward force is imposed on the mandrel, its cam surface 114 will cam the spring-like arms 110 outwardly, enabling the mandrel 10 to shift downwardly to place its valve head 38 and seal 30 within the companion valve seat 31, to close the by-pass passages 28. When such position is reached, the latch heads 111 will spring inwardly into a retaining groove 115 provided in the body sub 12 above its lower cam shoulder 114. The lower side 116 of this groove is inclined in a downward and outward direction to provide a cam surface coacting with the lower tapered surfaces 113 on the latch heads 111. The coengagement between these surfaces will retain the mandrel 10 in a downward position within the apparatus surrounding it, to hold the valves 38, 30, 31 in a closed position. When a sufficient upward pull is taken on the tubular string E and the mandrel 10 to overcome the holding force of the latches 110, 111 against the upper cam surface 116, the latter will cam or spring the arms 110 in outward direction to remove the heads 111 from the groove 115, whereupon the mandrel 10 moves upwardly to open the by-pass valve, at which time the latch heads 111 will spring inwardly once again into a position below the lower cam surface 114 on the body sub 12.

The latch device provides for the releasable holding of the mandrel 10 in either its valve-open or valve-closed position. The spring force required to release the latches 110, 111 can be made quite substantial. For example, a total force of about 3,000 pounds might be required before the latches will release and allow the mandrel to shift with respect to the valve seat 31, to place the by-pass control valve in either an open or closed position.

The inventors claim:

1. In apparatus adapted to be anchored in a well casing disposed in a well bore: a body *structure having a central passage through which fluid can flow*; normally retracted casing gripping members on said body *structure* for anchoring said body *structure* in the well casing; *hydraulically operable* means for [hydraulically] expanding said gripping members into engagement with the well casing; means communicating with said [expanding] *hydraulically operable* means and providing a by-pass *externally of said central passage* for fluid in the well casing through the apparatus while the apparatus is being lowered in the well casing to prevent *fluid* pressure from being developed in said [expanding] *hydraulically operable* means *to operate the same to expand the gripping members*; *by-pass closing means for closing said by-pass adjacent one end portion thereof* after the apparatus has been lowered in the well casing to enable *fluid pressure to be developed in the well casing and transmitted through the other end portion of said by-pass and through the by-pass itself to* said [expanding] *hydraulically operable* means to hydraulically *operate the same to expand and thereby* engage said gripping members with the well casing; and releasable means holding said by-pass *closing* means in its open condition while the apparatus is being lowered in the well casing.

2. In apparatus adapted to be anchored in a well casing disposed in a well bore: a body *structure having a central passage through which fluid can flow*; normally retracted casing gripping members on said body *structure* for anchoring said body *structure* in the well casing; *hydraulically operable* means for [hydraulically] expanding said gripping members into engagement with the well casing; means providing a by-pass *externally of said central passage and* interiorly of said body *structure* communicating with said [expanding] *hydraulically operable* means through which fluid in the well casing can flow while the apparatus is being lowered in the well casing to prevent fluid pressure from [developing] *being developed* in said [expanding] *hydraulically operable* means *to operate the same*; *by-pass closing* means for closing said by-pass *adjacent one end portion thereof* after the apparatus has been lowered in the well casing to enable *fluid pressure to be developed in the well casing and transmitted through the other end portion of said by-pass and through the by-pass itself to* said [expanding] *hydraulically operable* means to hydraulically *operate the same to expand and thereby* engage said gripping members with the well casing; and releasable means holding said by-pass *closing* means in its open condition while the apparatus is being lowered in the well casing.

3. In apparatus adapted to be anchored in a well cas- disposed in a well bore: a body *structure having a central passage through which fluid can flow*; normally retracted casing gripping members on said body *structure* for anchoring said body *structure* in the well casing; *hydraulically operable* means for [hydraulically] expanding said gripping members into engagement with the well casing; means providing a by-pass *externally of said central passage and* interiorly of said body *structure* communicating with said [expanding] *hydraulically operable* means through which fluid in the well casing can flow while the apparatus is being lowered in the well casing to prevent fluid pressure from developing in said [expanding] *hydraulically operable* means *to operate the same to expand the gripping members*; *by-pass closing* means for closing said by-pass above said [expanding] *hydraulically operable* means after the apparatus has been lowered in the well casing to enable fluid pressure in the well casing below the apparatus to be developed and act *through the lower end portion of said by-pass and through the by-pass* upon said [expanding] *hydraulically operable* means [and] *to* hydraulically *operate the same to expand and thereby* engage said gripping members with the well casing; and releasable means holding said by-pass *closing* means in its open condition while the apparatus is being lowered in the well casing.

4. In apparatus adapted to be anchored in a well casing disposed in a well bore: a body *structure having a central passage through which fluid can flow and also* having a plurality of cylindrical bores therein opening to the interior of said body *structure externally of said central passage*; gripping members in said bores expandable outwardly against the well casing in response to fluid pressure within *the interior* of said body *structure* and bores; means providing [a fluid by-pass] *another fluid passage* within said body *structure externally of said central passage and* communicating with said bores; means holding said [by-pass] *another passage* means in its open condition while the apparatus is being lowered in the well casing; *another passage closing* means for closing said [by-pass] *another passage adjacent an end portion thereof* after said apparatus has been lowered in the well casing *to enable fluid pressure to be developed in the well casing and transmitted through the other end portion of said another passage means and through said another passage means itself to said bores communicating therewith to expand said gripping members against the well casing.*

5. In apparatus adapted to be anchored in a well cas- disposed in a well bore: a body *structure having a central passage through which fluid can flow and also* having a plurality of cylindrical bores therein opening to the interior of said body *structure externally of said central passage*; gripping members in said bores expandable outwardly against the well casing in response to fluid pressure within *the interior* of said body *structure* and bores; means providing [a fluid by-pass] *another fluid passage* within said body *structure externally of said central passage and* communicating with said bores; releasable means holding said [by-pass] *another passage* means in its open condition while the apparatus is being lowered in the well casing; *another passage closing* means for closing said [by-pass] *another passage means* above said cylindrical bores after said apparatus has been lowered in the well casing to enable fluid pressure in the well casing below the apparatus to be developed for action through *the lower end portion of said another passage means and through* said [by-pass] *another passage means itself* upon the gripping members to expand said gripping members against the well casing.

6. In apparatus adapted to be anchored in a well casing disposed in a well bore: a body having a plurality of cylindrical bores therein opening to the interior of said body; gripping members in said bores expandable outwardly against the well casing in response to fluid pressure within said body and bores; a tubular mandrel within said body; said mandrel and body providing a fluid by-pass therebetween communicating with said bores; releasable means for holding said by-pass open while the apparatus is being lowered in the well casing; means operatively connected to said mandrel and body for closing said by-pass above said bores.

7. In apparatus adapted to be anchored in a well casing disposed in a well bore: a body; casing gripping members on said body; means for hydraulically expanding said gripping members into engagement with the well casing; a tubular mandrel within said body, said mandrel and body providing a fluid by-pass therebetween communicating with said expanding means; releasable means for holding said by-pass open while the apparatus is being lowered in the well casing; means operatively connected to said mandrel and body for closing said by-pass above the point of communication between said by-pass and expanding means *to enable fluid pressure in the well casing ing below said apparatus to be developed for action through the lower end portion of said by-pass and through said by-pass itself upon said expanding means to expand said gripping members against the well casing.*

8. In apparatus adapted to be anchored in a well casing disposed in a well bore: a body having a plurality of cylindrical bores therein opening to the interior of said body; gripping members in said bores expandable outwardly against the well casing in response to fluid pressure within said body and bores; a tubular mandrel within said body; said mandrel having external longitudinally extending grooves providing a fluid by-pass and communicating with said bores; means operatively connected to said mandrel and body for closing said by-pass; and releasable means for holding said by-pass open while the apparatus is being lowered in the well casing.

9. In apparatus adapted to be anchored in a well casing disposed in a well bore: a body; normally retracted casing gripping members on said body for anchoring said body in the well casing; means for hydraulically expanding said gripping members into engagement with the well casing; a tubular mandrel within said body; said mandrel having external longitudinally extending *by-pass* grooves *extending through said body and* providing a fluid by-pass communicating with said expanding means; *said body engaging the periphery of said mandrel between said grooves to be supported thereby;* means operatively connected to said mandrel and body for closing said by-pass; and releasable means for holding said by-pass open while the apparatus is being lowered in the well casing.

10. In apparatus adapted to be lowered in a well casing disposed in a well bore: a mandrel; a packing structure on said mandrel, including a sleeve on *and bearing against the periphery of* said mandrel, *to be supported thereby* normally retracted pliant, elastic packing means on said sleeve adapted to engage the well casing, and means for expanding said packing means against the well casing; said mandrel having a plurality of external longitudinally extending fluid by-pass grooves extending through said sleeve; and means for selectively opening and closing said grooves.

11. In apparatus adapted to be anchored in a well casing disposed in a well bore: a body having a plurality of cylindrical bores therein opening to the interior of said body; gripping members in said bores expandable outwardly against the well casing in response to fluid pressure within said body and bores; a tubular mandrel within said body; said mandrel and body providing a fluid by-pass therebetween communicating with said bores; means for holding said by-pass open while the apparatus is being lowered in the well casing; means operatively connected to said mandrel and body for closing said by-pass above said bores; and means responsive to hydraulic pressure in said by-pass for exerting a downward force on said mandrel.

12. In apparatus adapted to be anchored in a well casing disposed in a well bore: a body; casing gripping members on said body; means for hydraulically expanding said gripping members into engagement with the well casing; a tubular mandrel within said body; said mandrel and body providing a fluid by-pass therebetween communicating with said expanding means; means for holding said by-pass open while the apparatus is being lowered in the well casing; means operatively connected to said mandrel and body for closing said by-pass above the point of communication between said by-pass and expanding means; and means responsive to hydraulic pressure in said by-pass for exerting a downward force on said mandrel.

13. In apparatus adapted to be anchored in a well casing disposed in a well bore: a body having a plurality of cylindrical bores therein opening into the interior of said body; gripping members in said bores expandable outwardly against the well casing in response to fluid pressure within said body and bores to prevent upward movement of said body in the well casing; a tubular mandrel extending through said body and engageable with said body to transmit downward force thereto; a packing structure around said mandrel below said gripping members and adapted to seal against the well casing; means providing a fluid by-pass between the exterior of said mandrel and body and between said mandrel and packing structure; means for anchoring said body and packing structure to the well casing against downward movement; control means releasably coupling said mandrel to said anchoring means; and valve means operatively connected to said mandrel and body for opening and closing the upper portion of said by-pass; said control means being operative to hold said valve means in open position during lowering of the apparatus in the well casing.

14. In apparatus adapted to be anchored in a well casing disposed in a well bore: a body having a plurality of cylindrical bores therein opening into the interior of said body; gripping members in said bores expandable outwardly against the well casing in response to fluid pressure within said body and bores to prevent upward movement of said body in the well casing; a tubular mandrel extending through said body and engageable with said body to transmit downward force thereto; a packing structure around said mandrel below said gripping members and adapted to seal against the well casing; said mandrel having external longitudinal fluid by-pass grooves extending from a point below said packing structure to a point above said cylindrical bores; valve means operatively connected to said mandrel and body for opening and closing the upper portion of said by-pass grooves; means for anchoring said body and packing structure to the well casing against downward movement; and control means releasably coupling said mandrel to said anchoring means and adapted to hold said valve means in open position during lowering of the apparatus in the well casing.

15. In apparatus adapted to be anchored in a well casing disposed in a well bore: a body having a plurality of cylindrical bores therein opening into the interior of said body; gripping members in said bores expandable outwardly against the well casing in response to fluid pressure within said body and bores to prevent upward movement of said body in the well casing; a tubular mandrel extending through said body and engageable with said body to transmit downward force thereto; a packing structure around said mandrel below said gripping members and adapted to seal against the well casing; said mandrel having external longitudinal fluid by-pass grooves extending from a point below said packing structure to a point above said cylindrical bores; a cylinder connected to said body and communicating with said by-pass grooves; a piston in said cylinder engaging said mandrel and subject to the pressure of the fluid in said grooves and cylinder to exert a downward force on said mandrel; a valve head on said mandrel above said grooves; a valve seat connected to said cylinder and engageable by said head to close the upper ends of said grooves; means for anchoring said body and packing structure to the well casing against downward movement; and control means releasably coupling said mandrel to said anchoring means.

16. In apparatus adapted to be anchored in a well casing disposed in a well bore: a body having a plurality of cylindrical bores therein opening into the interior of said body; gripping members in said bores expandable outwardly against the well casing in response to fluid pressure within said body and bores to prevent downward movement of said body in the well casing; a tubular mandrel extending through said body and engageable with said body to transmit downward force thereto; a packing structure around said mandrel below said gripping members and adapted to seal against the well casing; said mandrel having external longitudinal fluid by-pass grooves extending from a point below said packing structure to a point above said cylindrical bores; said packing structure including a sleeve along said mandrel surrounding said grooves, normally retracted pliant, elastic packing means on said sleeve adapted to engage the well casing, and means for expanding said packing means against the well casing; valve means operatively connected to said mandrel and body for opening and closing the upper portions of said by-pass grooves; means for anchoring said body and packing structure to the well casing against downward movement; and control means releasably coupling said mandrel to said anchoring means.

17. In apparatus adapted to be anchored in a well casing disposed in a well bore: a body having a plurality of cylindrical bores therein opening into the interior of said body; gripping members in said bores expandable outwardly against the well casing in response to fluid pressure within said body and bores to prevent upward movement of said body in the well casing; a tubular mandrel extending through said body and engageable with said body to transmit downward force thereto; a packing structure around said mandrel below said gripping members and adapted to seal against the well casing; said mandrel having external longitudinal fluid by-pass grooves extending from a point below said packing structure to a point above said cylindrical bores; said packing structure including a sleeve on said mandrel surrounding said groove and pliant, elastic packing means on said sleeve adapted to engage the well casing; a cylinder connected to said body and communicating with said by-pass grooves; a piston in said cylinder engaging said mandrel and subject to the pressure of the fluid in said grooves and cylinder to exert a downward force on said mandrel; a valve head on said mandrel above said grooves; a valve seat connected to said cylinder and engaged by said head to close the upper ends of said grooves; means for anchoring said body and packing structure to the well casing against downward movement; and control means releasably coupling said mandrel to said anchoring means.

18. In apparatus adapted to be anchored in a well casing disposed in a well bore: a body having a plurality of cylindrical bores therein opening into the interior of said body; gripping members in said bores expandable outwardly against the well casing in response to fluid pressure within said body and bores; a tubular mandrel extending through said body; a packing structure around said mandrel adapted to seal against the well casing; said mandrel having external longitudinal fluid by-pass grooves extending around said packing structure and cylindrical bores; a cylinder connected to said body and communicating with said by-pass grooves; a piston in said cylinder engaging said mandrel and subject to the pressure of the fluid in said grooves and cylinder to exert a longitudinal force on said mandrel; a valve head on said mandrel to one side of said grooves; and a valve seat connected to said cylinder and engaged by said head to close said grooves.

19. In apparatus adapted to be anchored in a well casing disposed in a well bore: a body having a plurality of cylindrical bores therein opening into the interior of said body; gripping members in said bores expandable outwardly against the well casing in response to fluid pressure within said body and bores; a tubular mandrel extending through said body; a packing structure around said mandrel adapted to seal against the well casing; said mandrel having external longitudinal fluid by-pass grooves extending around said packing structure and cylindrical bores; a cylinder connected to said body and communicating with said by-pass grooves; a piston in said cylinder engaging said mandrel and subject to the pressure of the fluid in said grooves and cylinder to exert a longitudinal force on said mandrel; a valve head on said mandrel to one side of said grooves; a valve seat connected to said cylinder and engaged by said head to close said grooves; said packing structure including a sleeve on said mandrel surrounding its grooves and pliant, elastic packing means on said sleeve adapted to engage the well casing.

*20. In apparatus adapted to be anchored in a well casing disposed in a well bore: a body; normally retracted casing gripping members on said body for anchoring said body in the well casing; hydraulically operable means for expanding said gripping members into engagement with the well casing; a tubular mandrel within said body, said mandrel and body providing a fluid passage therebetween communicating with said hydraulically operable means; passage closing means for closing said passage adjacent an end portion thereof after the apparatus has been lowered in the well casing to enable fluid pressure to be developed in the well casing and transmitted through the other end portion of said passage and through said passage itself to said hydraulically operable means to hydraulically operate the same to expand and thereby engage said gripping members with the well casing; and releasable means holding said passage closing means in its open condition while the apparatus is being lowered in the well casing.*

*21. In apparatus adapted to be anchored in a well casing disposed in a well bore: a body; normally retracted casing gripping members on said body for anchoring said body in the well casing; hydraulically operable means for expanding said gripping members into engagement with the well casing; a tubular mandrel within said body, said mandrel and body providing a fluid passage therebetween communicating with said hydraulically operable means which is open while the apparatus is being lowered in the well casing to prevent fluid pressure from developing in said hydraulically operable means to operate the same to expand the gripping members; passage closing means for closing said passage above the point of communication between said passage and hydraulically operable means after the apparatus has been lowered in the well casing to enable fluid pressure in the well casing below the apparatus to be developed for transmission through the lower end portion of said passage and said passage itself to said hydraulically operable means to hydraulically operate the same to expand and thereby engage said gripping members with the well casing; and releasable means holding said passage closing means in its open condition while the apparatus is being lowered in the well casing.*

*22. In apparatus adapted to be anchored in a well casing disposed in a well bore: a body having a plurality of cylindrical bores therein opening to the interior of said body; gripping members in said bores expandable outwardly against the well casing in response to fluid pressure within said body and bores; a tubular mandrel within said body, said mandrel and body providing a fluid passage therebetween communicating with said bores; means holding said passage in its open condition while the apparatus is being lowered in the well casing; and passage closing means for closing said passage adjacent an end portion thereof after said apparatus has been lowered in the well casing to enable fluid pressure to be developed in the well casing and transmitted through the other end portion of said passage and through said passage itself to said bores communicating therewith to expand said gripping members against the well casing.*

*23. In apparatus adapted to be anchored in a well casing disposed in a well bore: a body having a plurality of cylindrical bores therein opening to the interior of said body; gripping members in said bores expandable outwardly against the well casing in response to fluid pressure within said body and bores; a tubular mandrel within said body, said mandrel and body providing a fluid passage therebetween communicating with said bores; releasable means holding said passage in its open condition while the apparatus is being lowered in the well casing; passage closing means for closing said passage above said cylindrical bores after said apparatus has been lowered in the well casing to enable fluid pressure in the well casing below the apparatus to be developed for action through the lower end portion of said passage and through said passage itself upon the gripping members to expand said gripping members against the well casing.*

*24. In apparatus adapted to be anchored in a well casing disposed in a well bore: a body; normally retracted casing gripping members on said body for anchoring said body in the well casing; hydraulically operable means for expanding said gripping members into engagement with the well casing; a tubular mandrel within said body; a normally retracted packing structure around said mandrel below said gripping members; means for expanding said packing structure into sealing engagement with the well casing; means providing a fluid passage between the exterior of said mandrel and body and between said mandrel and packing structure communicating with said hydraulically operable means which passage is open adjacent to its upper end portion while the apparatus is being lowered in the well casing to prevent fluid pressure from developing in said hydraulically operable means to operate the same to expand the gripping members; passage closing means for closing said upper end portion of said passage above the point of communication between said passage and hydraulically operable means after the apparatus has been lowered in the well casing to enable fluid pressure in the well casing below the expanded packing structure to be developed and pass through a lower portion of said passage and said passage to said hydraulically operable means to hydraulically operate the same to expand and thereby engage said gripping members with the well casing; and releasable means holding said passage closing means in its open condition while the apparatus is being lowered in the well casing.*

*25. In apparatus adapted to be anchored in a well casing disposed in a well bore: a body having a plurality of cylindrical bores therein opening to the interior of said body; gripping members in said bores expandable outwardly against the well casing in response to fluid pressure within said body and bores; a tubular mandrel within said body; a normally retracted packing structure around said mandrel below said gripping members; means for expanding said packing structure into sealing engagement with the well casing; means providing a fluid passage*

*between the exterior of said mandrel and body and between said mandrel and packing structure communicating with said bores; releasable means holding the upper portion of said passage in its open condition while the apparatus is being lowered in the well casing; passage closing means for closing said upper portion of said passage above said cylindrical bores after said apparatus has been lowered in the well casing to enable fluid pressure in the well casing below the expanded packing structure to be developed and pass through a lower portion of said passage and said passage to said bores for action upon the gripping members to expand said gripping members against the well casing.*

References Cited in the file of this patent or the original patent

UNITED STATES PATENTS

| | | |
|---|---|---|
| 1,643,119 | Hartman | Sept. 20, 1927 |
| 2,633,918 | Le Rouax | Apr. 7, 1953 |
| 2,691,418 | Connolly | Oct. 12, 1954 |
| 2,695,672 | Lane | Nov. 30, 1954 |
| 2,722,279 | Collins | Nov. 1, 1955 |
| 2,765,853 | Brown | Oct. 9, 1956 |
| 2,893,492 | Brown | July 7, 1959 |